(12) United States Patent
Khan et al.

(10) Patent No.: US 11,392,494 B2
(45) Date of Patent: Jul. 19, 2022

(54) TECHNOLOGIES FOR PERFORMANT COLUMN READ OPERATIONS ON CLUSTERED DATA IN A DIMM ARCHITECTURE

(71) Applicant: Intel Corporation, Santa Clara, CA (US)

(72) Inventors: Jawad Khan, Portland, OR (US); Chetan Chauhan, Folsom, CA (US); Rajesh Sundaram, Folsom, CA (US); Sourabh Dongaonkar, Santa Clara, CA (US); Sandeep Guliani, Folsom, CA (US); Dipanjan Sengupta, Hillsboro, OR (US); Mariano Tepper, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/894,180

(22) Filed: Jun. 5, 2020

(65) Prior Publication Data
US 2020/0301828 A1    Sep. 24, 2020

(51) Int. Cl.
  *G06F 12/06*   (2006.01)
  *G06F 13/40*   (2006.01)
  *G06F 12/02*   (2006.01)

(52) U.S. Cl.
  CPC ...... *G06F 12/0692* (2013.01); *G06F 12/0207* (2013.01); *G06F 13/4027* (2013.01); *G06F 2212/1016* (2013.01)

(58) Field of Classification Search
None
See application file for complete search history.

(56) References Cited

U.S. PATENT DOCUMENTS

| 5,150,328 A * | 9/1992 | Aichelmann, Jr. .... G11C 5/066 365/189.03 |
| 2015/0071021 A1* | 3/2015 | Amberg ............. G06F 12/0607 365/231 |
| 2019/0042401 A1* | 2/2019 | Khan ................... G06F 3/0683 |
| 2019/0146717 A1* | 5/2019 | Khan ................... G06F 3/0659 711/154 |
| 2021/0004321 A1* | 1/2021 | Jeong ................ G11C 13/0023 |

* cited by examiner

*Primary Examiner* — Yaima Rigol
(74) *Attorney, Agent, or Firm* — Compass IP Law PC

(57) ABSTRACT

Technologies for column reads for clustered data include a device having a column-addressable memory and circuitry connected to the memory. The column-addressable memory includes multiple dies. The circuitry may be configured to determine multiple die offsets based on a logical column number of the data cluster, determine a base address based on the logical column number, program the dies with the die offsets. The circuitry is further to read logical column data from the column-addressable memory. To read the data, each die adds the corresponding die offset to the base address. The column-addressable memory may include multiple command/address buses. The circuitry may determine a starting address for each of multiple logical columns and issue a column read for each starting address via a corresponding command/address bus. Other embodiments are described and claimed.

21 Claims, 10 Drawing Sheets

FIG. 5

TECHNOLOGIES FOR PERFORMANT COLUMN READ OPERATIONS ON CLUSTERED DATA IN A DIMM ARCHITECTURE

BACKGROUND

Content-based similarity search, or simply similarity search, is a key technique that underpins machine learning (ML) and artificial intelligence applications (AI). In performing a similarity search, query data, such as data indicative of an object (e.g., an image) is used to search a database to identify data indicative of similar objects (e.g., similar images). However, the sheer volume and richness of data used in large-scale similarity searches is an extremely challenging problem that is both compute and memory intensive. In some systems, hashing methods are used to perform stochastic associative searches faster than may otherwise be possible. However, hashing methods typically provide an imperfect conversion of data from one space (e.g., domain) to another space (e.g., domain) and may yield search results that are degraded (e.g. in terms of accuracy) as compared to searches using the original space of the data to be searched.

Given the size of modern databases (on the order of billions of entries), the search speed of stochastic associative memories may not cope with current throughput demands (in the order of tens or hundreds of thousands of searches per second). To improve effective search speed, the database may be partitioned into clusters. Each cluster has an associated representative. A search query is compared against all cluster representatives and then a subset of the database is explored. Exploring the database may include taking the union of database entries in the selected clusters and retrieving the most similar elements in this set.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a schematic diagram illustrating a memory layout of clustered data that may be stored in the memory media of FIGS. 1-3;

DETAILED DESCRIPTION OF THE DRAWINGS

Figure 1:
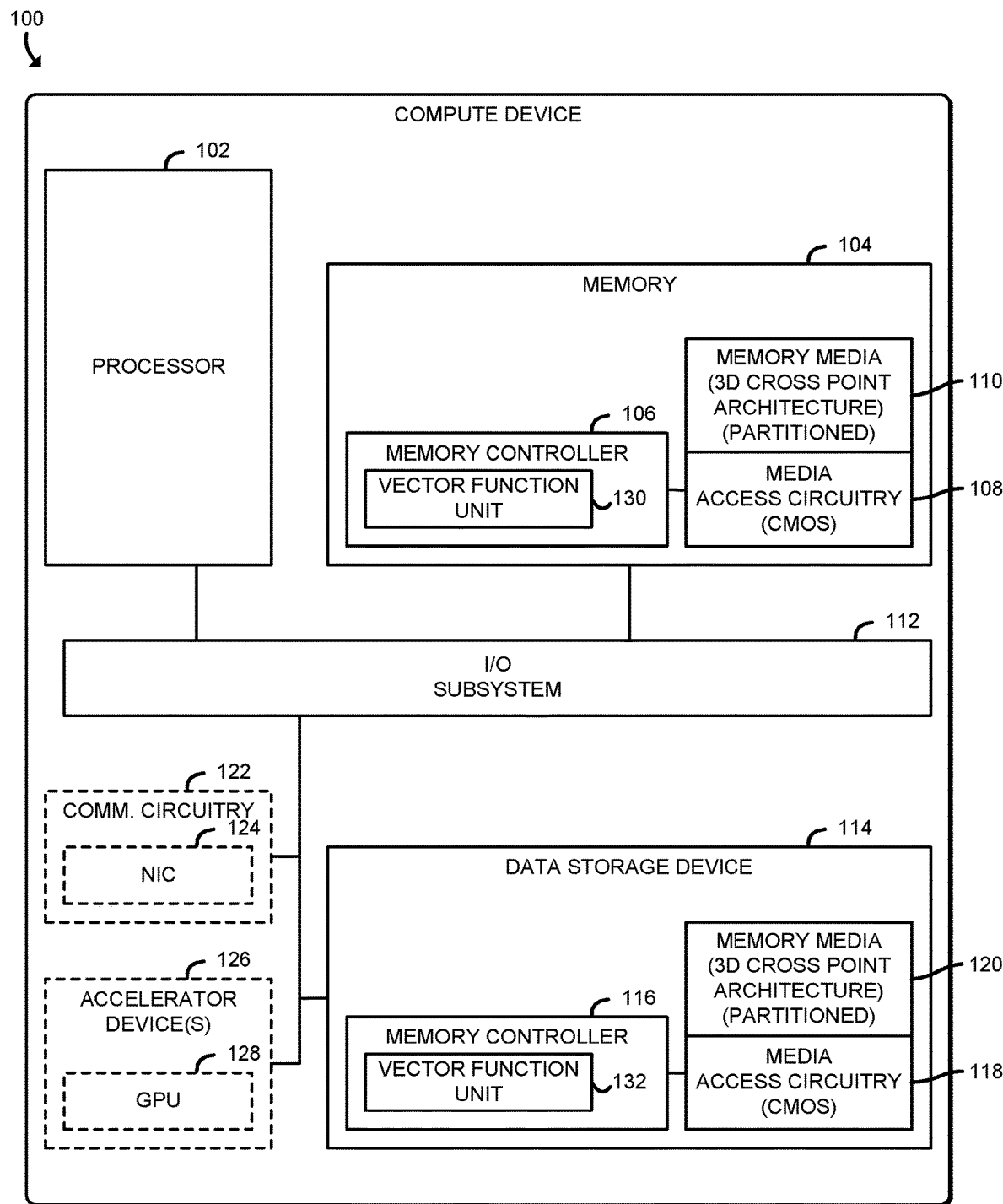
FIG. 1 is a simplified diagram of at least one embodiment of a compute device for providing column data layouts for clustered data using column-read enabled memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for column reads of clustered data using column-read enabled memory includes a processor 102, a memory 104, an input/output (I/O) subsystem 112, a data storage device 114, communication circuitry 122, and one or more accelerator devices 126. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. The term "memory," as used herein in reference to performing memory reads may refer to the memory 104 and/or the data storage device 114, unless otherwise specified. As explained in more detail herein, media access circuitry 108, 118 (e.g., any circuitry or device configured to access and operate on data in the corresponding memory media 110, 120) connected a corresponding memory media 110, 120 (e.g., any device or material that data is written to and read from) may provide performant column read operations for clustered data. As described further below, column read operations may include quasi-static programmable die offsets as described in connection with FIGS. 6-7, dynamic programmable die offsets as described in connection with FIGS. 8-9, and per-die addressing as described in connection with FIGS. 10-11. The column data layouts disclosed herein may improve read performance by reducing the total number of required column read operations, for example by avoiding multiple reads on cluster edges, avoiding modulo penalties or otherwise reducing reads, and by reading multiple logical columns per operation, especially for small clusters.

The memory media 110, in the illustrative embodiment, has a three dimensional cross point architecture that has data access characteristics that differ from other memory architectures (e.g., dynamic random access memory (DRAM)), such as enabling access to one bit per tile and incurring time delays between reads or writes to the same partition or other partitions. The media access circuitry 108 is configured to make efficient use (e.g., in terms of power usage and speed) of the architecture of the memory media 110, such as by accessing multiple tiles in parallel within a given partition, utilizing scratch pads (e.g., relatively small, low latency memory) to temporarily retain and operate on data read from the memory media 110, and broadcasting data read from one partition to other portions of the memory 104 to enable matrix calculations (e.g., tensor operations) to be performed in parallel within the memory 104. Additionally, in the illustrative embodiment, instead of sending read or write requests to the memory 104 to access matrix data, the processor 102 may send a higher-level request (e.g., a request for a macro operation, a top n similarity search query request, or other stochastic associative search request) and provide the locations of the input data to be utilized in the requested operation (e.g., an input query). Further, rather than sending back the resulting data to the processor 102, the memory 104 may merely send back an acknowledgement or other indication of status (e.g., "Done"), indicating that the requested operation has been completed. As such, many compute operations, such as artificial intelligence operations (e.g., stochastic associative searches) can be performed in memory (e.g., in the memory 104 or in the data storage device 114), with minimal usage of the bus (e.g., the I/O subsystem) to transfer data between components of the compute device 100 (e.g., between the memory 104 or data storage device 114 and the processor 102).

In some embodiments the media access circuitry 108 is included in the same die as the memory media 110. In other embodiments, the media access circuitry 108 is on a separate die but in the same package as the memory media 110. In yet other embodiments, the media access circuitry 108 is in a separate die and separate package but on the same dual in-line memory module (DIMM) or board as the memory media 110.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize a neural network or other machine learning structure to learn and make inferences). In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes the memory media 110 and the media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. The media access circuitry 108 is also connected to the memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on stochastic associative searches to recognize objects, make inferences, and/or perform related artificial intelligence operations). In some embodiments, the memory controller 106 may include a vector function unit (VFU) 130 which may be embodied as any device or circuitry (e.g., dedicated circuitry, reconfigurable circuitry, an application specific integrated circuit (ASIC), a field programmable gate array (FPGA), etc.) capable of offloading vector-based tasks from the processor 102 (e.g., comparing data read from specific columns of vectors stored in the memory media 110, determining Hamming distances between the vectors stored in the memory media 110 and a search key, sorting the vectors according to their Hamming distances, etc.).

Figure 2:
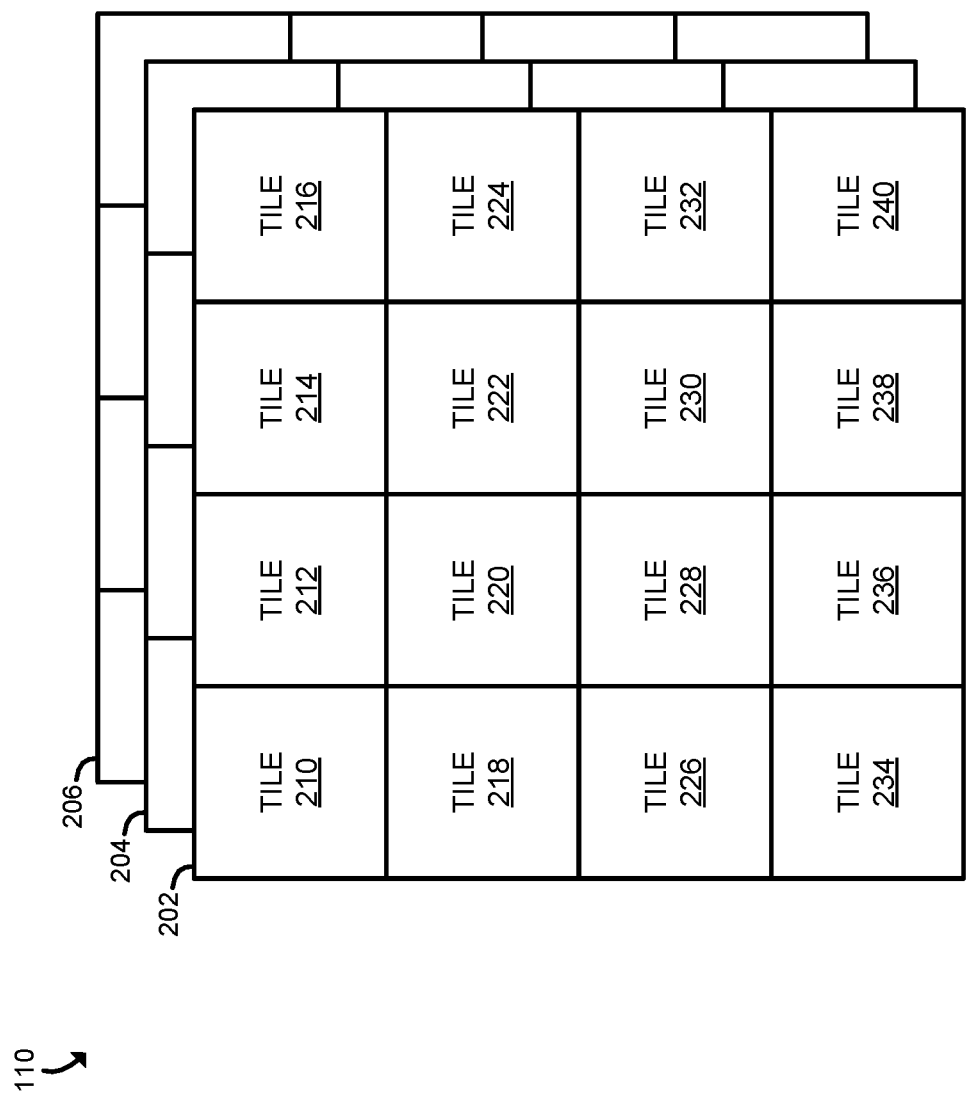
FIG. 2 is a simplified diagram of at least one embodiment of a memory media included in the compute device of FIG. 1.

Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). The memory media 110 includes multiple partitions, each of which includes the tile architecture. The partitions may be stacked as layers 202, 204, 206 to form a three dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, memory media 120 (also referred to as "storage media"), similar to the memory media 110, and media access circuitry 118, similar to the media access circuitry 108. Further, the memory controller 116 may also include a vector function unit (VFU) 132 similar to the vector function unit (VFU) 130. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, WiMAX, etc.) to effect such communication.

The illustrative communication circuitry 122 includes a network interface controller (NIC) 124, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

The one or more accelerator devices 126 may be embodied as any device(s) or circuitry capable of performing a set of operations faster than the general purpose processor 102. For example, the accelerator device(s) 126 may include a graphics processing unit 128, which may be embodied as any device or circuitry (e.g., a co-processor, an ASIC, reconfigurable circuitry, etc.) capable of performing graphics operations (e.g., matrix operations) faster than the processor 102.

Figure 3:
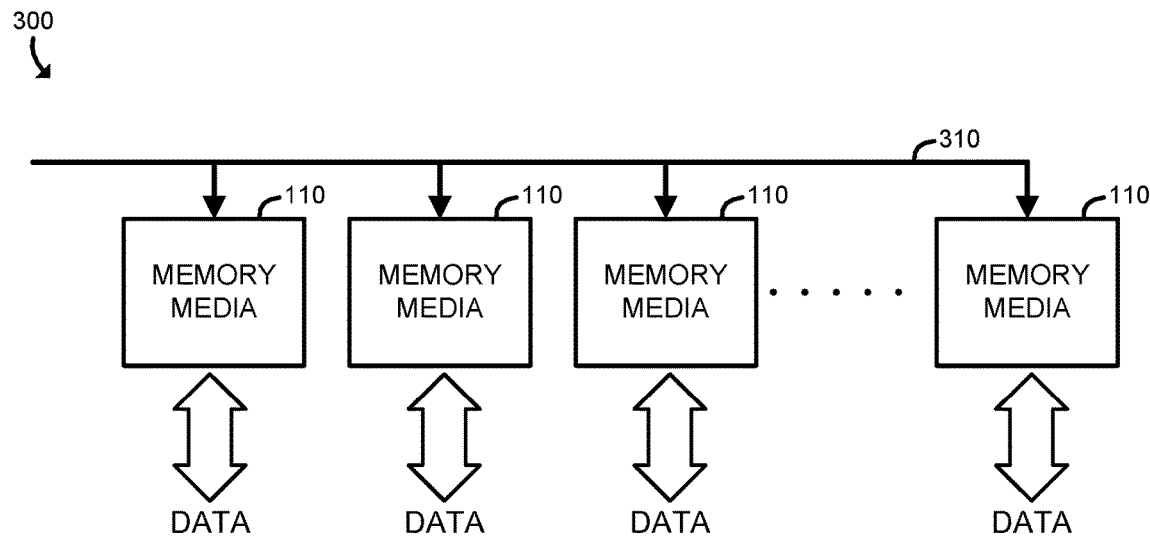
FIG. 3 is a simplified diagram of at least one embodiment of the memory media of the compute device of FIG. 1 in a dual in-line memory module (DIMM)

Referring now to FIG. 3, the compute device 100, in some embodiments, may utilize a dual in-line memory module (DIMM) architecture 300. In the architecture 300, multiple dies of the memory media 110 are connected with a shared command address bus 310. As such, in operation, data is read out in parallel across all of the memory media 110 connected to the shared command address bus 310. Data may be laid out across the memory media 110 in a configuration to allow reading the same column across all of the connected dies of the memory media 110.

Figure 4:
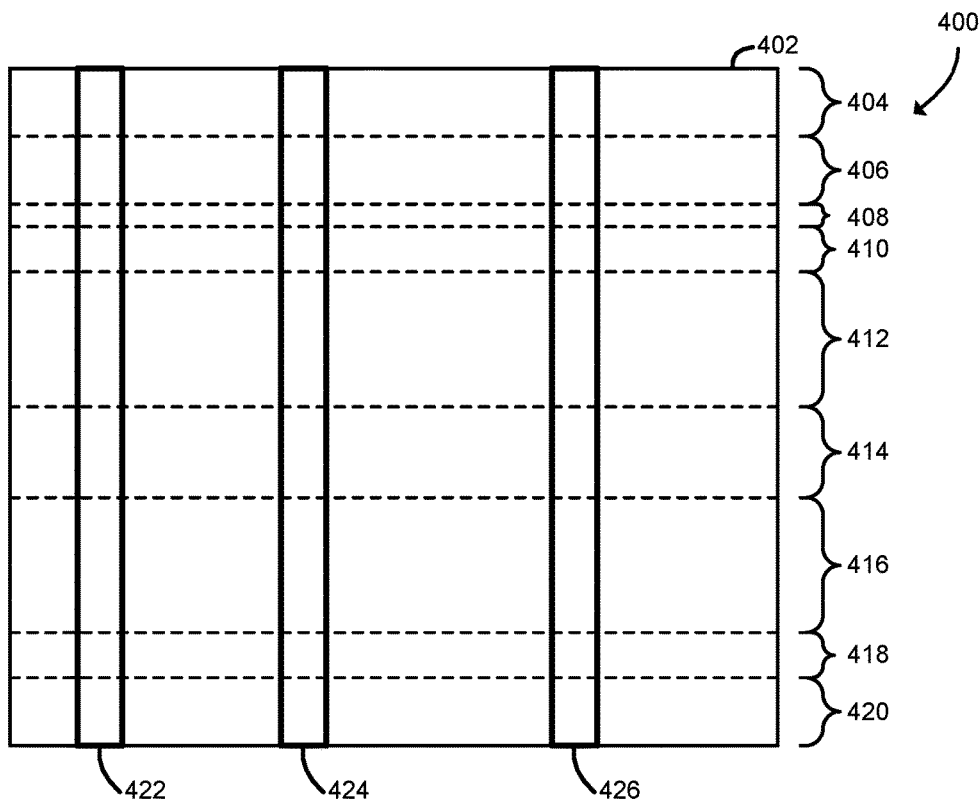
FIG. 4 is a simplified diagram of a clustered data set that may be processed by the compute device of FIGS. 1-3.

Referring now to FIG. 4, diagram 400 illustrates a clustered data set that may be accessed (e.g., read and/or written) by the compute device 100 in the memory 104 and/or the data storage device 114. The clustered data set is shown as a logical matrix 402, which includes data elements (e.g., bits) arranged in rows and columns. Rows of the matrix 402 are illustratively grouped into multiple clusters 404, 406, 408, 410, 412, 414, 416, 418, 420. Each cluster includes a contiguous group of rows, and each cluster may have a different length (i.e., number of rows). The rows of each cluster include data for each of the same columns; for example, columns 422, 424, 426 are illustrated extending through all of the clusters. An application may request a column read for column data included in a particular cluster or group of clusters. For example, a column read may be performed to retrieve data of the column 424 included in the cluster 414. It should be noted that the diagram 400 illustrates a logical view of the matrix 400, including a logical view of the rows and columns. As described further below, the rows and/or columns of the matrix 402 may be arranged in a different, column-based format when stored in the memory media 110, 120.

Figure 5:
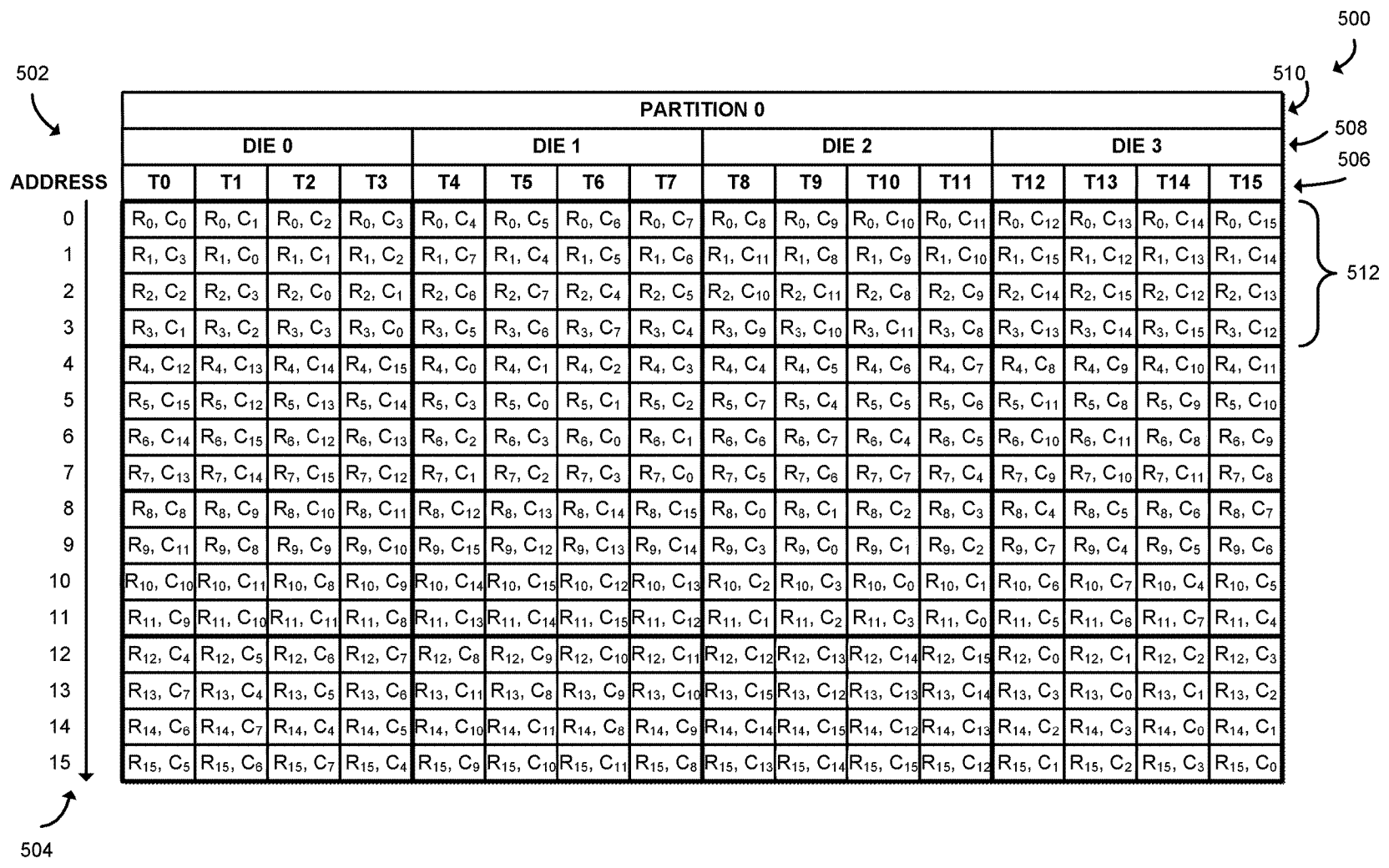

Referring now to FIG. 5, diagram 500 illustrates one potential embodiment of a column data format that may be accessed by the computing device 100 as described further below. The diagram 500 illustrates a memory media 502, for example the memory media 110 and/or the memory media 120 of FIG. 1. As shown, the illustrative memory media 502 is arranged into a number of rows 504 and tiles 506 (i.e., columns 506). Each of the tiles 506 is included in a die 508. Illustratively, each row 504 is formed from four dies 508 including four tiles 506 each for a total of 16 tiles 506. However, in other embodiments, each row may include another number of dies 508 and/or tiles 506. For example, in certain embodiments, each row 504 may include eight dies 508 having 128 tiles 506 each, for a total of 1024 tiles 506 per row 504. Additionally, the diagram 500 illustrates a single partition 510 of the memory media 502. It should be understood that the memory media 502 may include multiple partitions 510, such as eight partitions 510. Each row 504 is addressable by a row address, and each tile 506 is addressable by a column number. Each die 508 includes a preconfigured modulo limit 512, which is equal to the width of each die 508 in tiles 506. Accordingly, the illustrative modulo limit 512 is four. In other embodiments, the modulo limit 512 may be another number, such as 128 or 256.

The illustrative memory media 502 has stored therein a data cluster that is a logical matrix having 16 logical rows and 16 logical columns. As shown, the columns 506 of each row 504 are rotated by one column position for each subsequent row in a column sub-group across each die 508. For example, logical row zero, logical column three is stored in row address zero, tile number three; and logical row one, logical column three is rotated and stored in row address one, tile number zero; and so on. Additionally, the column sub-groups are rotated across the partition 510. For example a sub-block including logical rows 4-7 and logical columns 0-3 is rotated to tiles 4-7, a sub-block including logical rows 8-11 and logical columns 0-3 is rotated to tiles 8-11, and so on.

Figure 6:
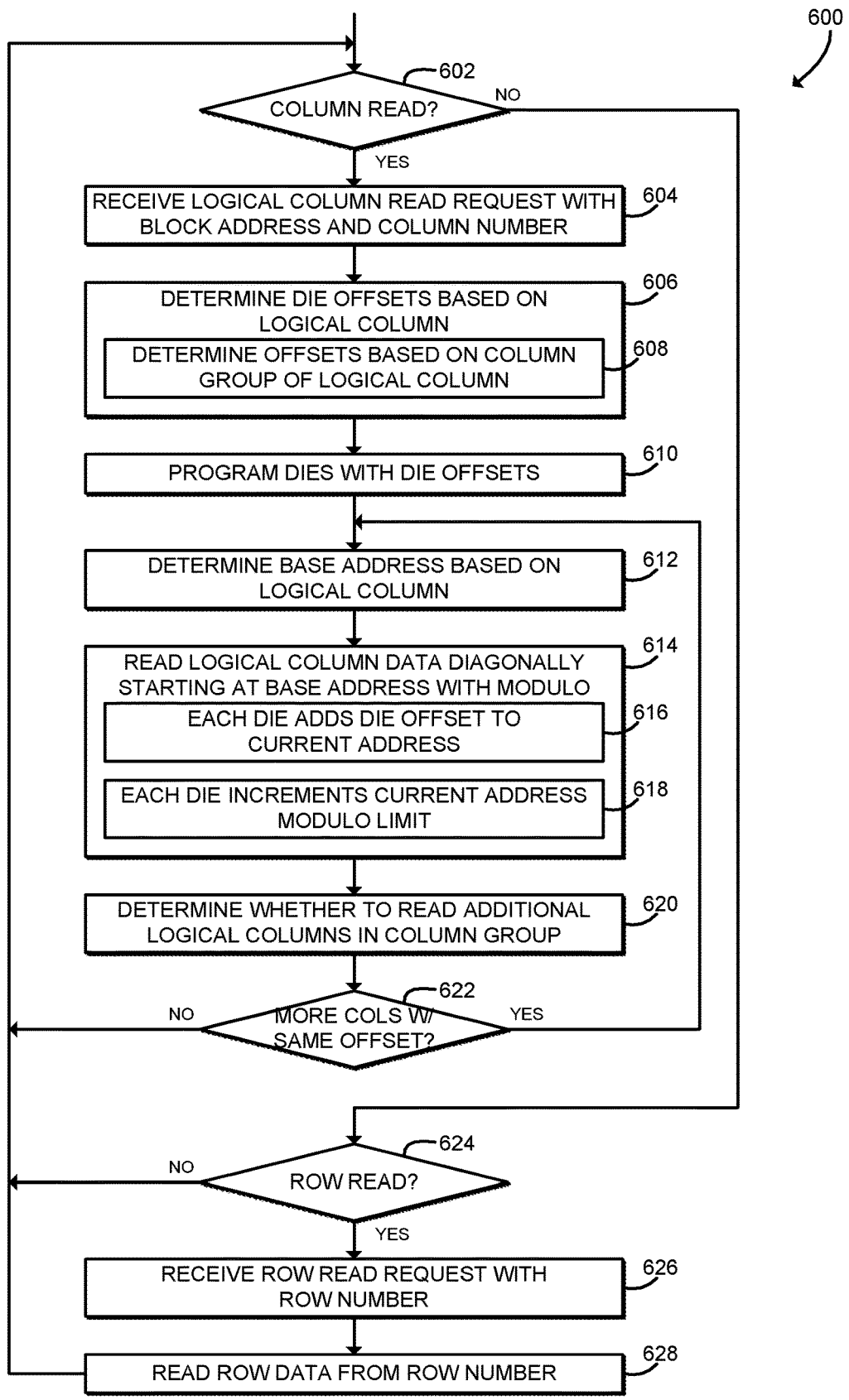
FIG. 6 is a simplified flow diagram of at least one embodiment of a method for a column read operation with programmable die offsets that may be performed by the compute device of FIG. 1.

Referring now to FIG. 6, the compute device 100, in operation, may execute a method 600 for column reads with programmable die offsets. The method 600 is described with reference to the memory 104. However, it should be understood that the method 600 could be performed additionally or alternatively using the data storage device 114. The method 600 begins with block 602 in which the compute device 100 (e.g., the media access circuitry 108) determines whether to perform a column read operation. If not, the method 600 branches ahead to block 624, described below. If the compute device 100 determines to perform a column read operation, the method 600 advances to block 604.

In block 604, the compute device 100 (e.g., the media access circuitry 108) receives a logical column read request. The column read request identifies a block address and a logical column number to read from a data cluster. The block address may be a row address that includes the starting row and/or column of the cluster (e.g., row zero). The media access circuitry 108 may receive the column read request, for example, from the memory controller 106. The column read request may originate from the host processor 102. In some embodiments, the memory access may be generated by the vector function unit 130 of the memory controller 106, for exampling in response to a macro command received from the host processor 102.

In block 606, the compute device 100 determines a die offset for each die of the memory media 110 based on the logical column. The compute device 100 may determine the offset for each die based on the difference between the block address and the row address of the left-most tile in that die that includes data from the requested logical column. In some embodiments in block 608 the compute device 100 may determine the die offsets based on a logical column group that includes the requested logical column. Each column sub-group may include a number of columns equal to the number of tiles included in a die of the memory media 110. The die offsets for all columns in that logical column group may be the same. For example, in an illustrative embodiment having dies that include 128 tiles each, each of columns 0-127 may use the same die offsets, each of columns 128-255 may use the same die offsets, and so on.

In block 610, the compute device 100 programs each die of the memory media 100 with the die offsets determined as described above in connection with block 606. The compute device 100 may use any appropriate technique to program the dies with the die offsets. For example, the compute device 100 may issue one or more reprogramming commands over a shared command/address bus connected to the dies.

In block 612, the compute device 100 determines a base address for the column read based on the logical column. The compute device 100 may determine the base address based on the block address, the die offsets determined as described above, and the requested logical column number. For example, the block address, die offset, and base address may add together to the row address of the left-most tile in each die that includes data from the requested logical column.

In block 614, the compute device 100 reads logical column data diagonally from the memory media 110 starting at the base address and using a modulo limit counter. The compute device 100 may issue a column read to all dies of the memory media 110 over a shared command/address (CA) bus. In block 616, each die of the memory media 100 starts reading data at the supplied base address plus the corresponding die offset programmed as described above in connection with block 610. Thus, the compute device 100 may read the column data in parallel across multiple dies of the selected partition. After reading data (e.g., a bit) from the current tile of each die, in block 618 each die increments one or more internal counters (e.g., row counter and/or column counter) modulo a preconfigured modulo limit. The modulo limit may be the width of each die in tiles (e.g., in columns); for example, in an illustrative embodiment, the modulo limit may be 128. After incrementing the counters, the memory media 110 continues reading column data across each die of the memory media 110.

In block 620, the compute device 100 determines whether to read additional logical columns in the same logical column group. For example, in the illustrative embodiment having dies with 128 tiles each, after reading logical column 0, the compute device 100 may determine whether to perform additional reads of any other logical columns in the group of columns 0-127. In block 622, the compute device 100 checks whether to read more columns of the same logical column group (having the same die offsets). If so, the method 600 loops back to block 612 to determine a new base address and perform additional column reads. As described above, each column in a logical column group uses the same die offsets. Thus, additional column reads may be performed without reprogramming the die offsets. Referring back to block 622, if the compute device 100 determines not to read additional column data, the method 600 loops back to block 602 to monitor for additional read operations.

Referring back to block 602, if the compute device 100 determines to perform a row read operation, the method 600 branches to block 624, in which the compute device 100 determines whether to perform a row read operation. If not, the method 600 loops back to block 602 to continue monitoring for read operations. If the compute device 100 determines to perform a row read operation, the method 600 advances to block 626.

In block 626 the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102. In block 628, the compute device 100 reads row data at the row address in the memory media 110. The row data is stored in the memory media 110 in a rotated format as described above in connection with FIG. 5. The compute device 100 may thus perform one or more rotation operations to recover the original, logical row data. After reading the data, the method 600 loops back to block 602 to continue monitoring for read operations.

Figure 7:
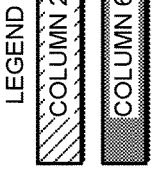
FIG. 7 is a schematic diagram illustrating memory accesses that may be performed by the method of FIG. 6.

Referring now to FIG. 7, diagram 700 illustrates example column reads of a data cluster included in the memory media 502 that may be performed according to the method 600 of FIG. 6. As described above, the illustrative memory media includes four dies 508 having four tiles 506 each. The diagram 700 shows data included in the logical column 2 as highlighted cells 702 and data included in the logical column 6 as highlighted cells 704.

To perform a column read of logical column 2 using the method 600 of FIG. 6, the compute device 100 may determine die offsets of 0, 4, 8, and 12 for die 0, die 1, die 2, and die 3, respectively. The compute device 100 may issue a column read with the starting row address of 2. As shown in FIG. 7, when the starting row address of 2 is added to the die offsets, data is read from row addresses 2, 6, 10, and 14 from die 0, die 1, die 2, and die 3, respectively. As described above, after reading the current bit, each die 508 increments one or more internal counters subject to the modulo limit 512 and continues reading data from logical column 2. Thus, using the illustrated die offsets, all data in the logical column 2 may be read with a single column read operation. The same die offsets may be used (with different starting row address) for any column in the logical column sub-group including columns 0-3.

Similarly, to perform a column read of logical column 6, the compute device 100 may determine die offsets of 12, 0, 4, and 8 for die 0, die 1, die 2, and die 3, respectively. The compute device 100 may issue a column read with the starting row address of 2. When the starting row address of 2 is added to the die offsets, data is read from row addresses 14, 2, 6, and 10 from die 0, die 1, die 2, and die 3, respectively. Thus, similar to logical column 2, all data in the logical column 6 may read with a single column read operation. The same die offsets may be used (with different starting row address) for any column in the logical column sub-group including columns 4-7. Other die offsets may be determined for the column sub-groups 8-11 and 12-15.

Reprogramming die offsets as described in FIGS. 6-7 may improve performance for column reads as compared to implementations with fixed die offsets. Reading certain columns with fixed die offsets may require multiple column read operations. However, as described above in connection with FIGS. 6-7, any column in the data cluster may be read with a single column read (for clusters that fit within a single block of the column-based memory, for example having length less than total width of the partition). For certain embodiments, reprogramming the die offsets does introduce delay compared to fix die offsets. Accordingly, speedup may depend on batch size (e.g., number of logical columns read between reprogramming die offsets). Batch processing may reduce average read times by 2-3×, and for larger batch sizes, column reads as described in FIGS. 6-7 may approach ideal throughput of the memory media 110.

Figure 8:
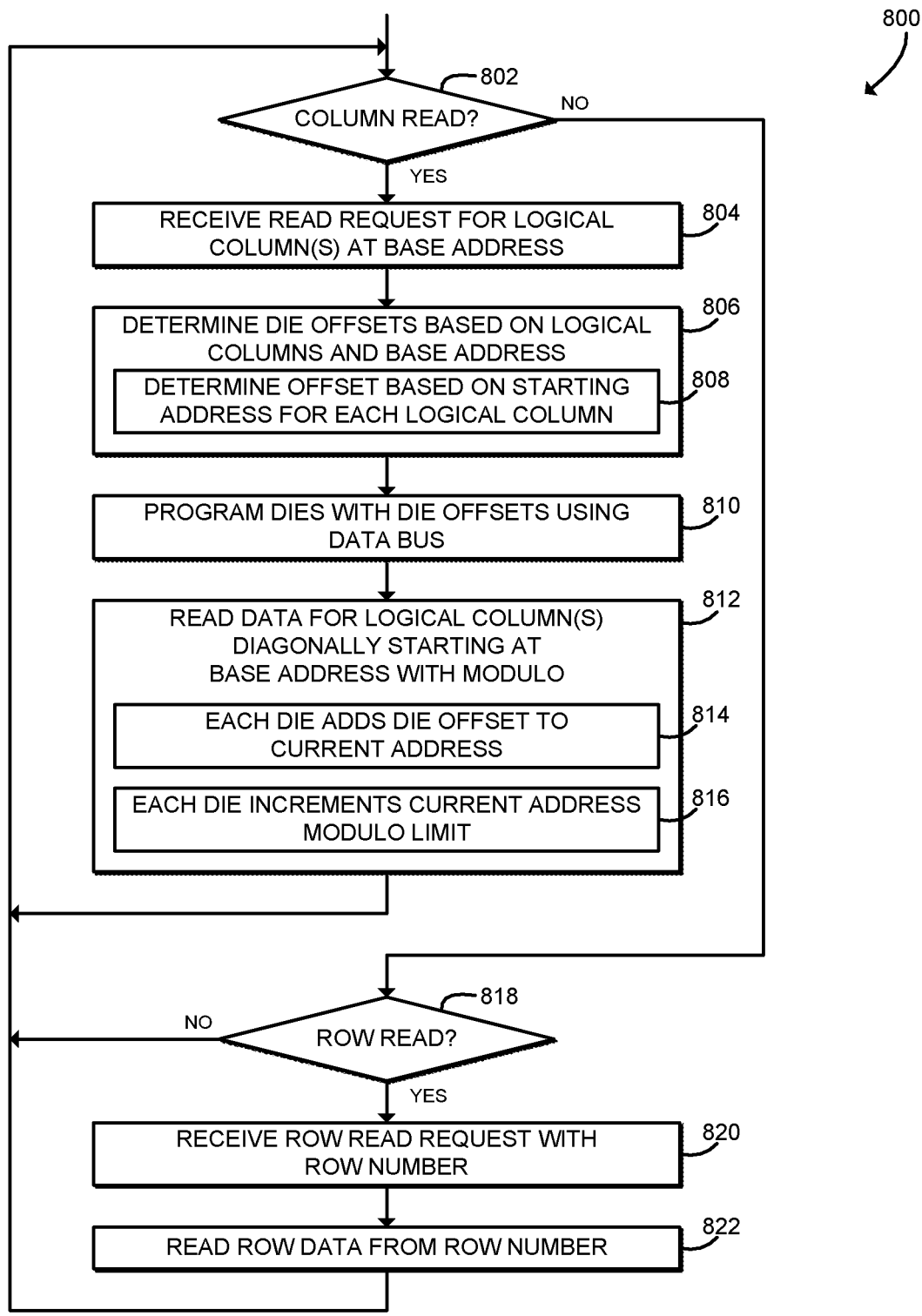
FIG. 8 is a simplified flow diagram of at least one embodiment of a method for a column read operation with dynamic die offsets that may be performed by the compute device of FIG. 1.

Referring now to FIG. 8, the compute device 100, in operation, may execute a method 800 for column reads with dynamic die offsets. The method 800 is described with reference to the memory 104. However, it should be understood that the method 800 could be performed additionally or alternatively using the data storage device 114. The method 800 begins with block 802 in which the compute device 100 (e.g., the media access circuitry 108) determines whether to perform a column read operation. If not, the method 800 branches ahead to block 818, described below. If the compute device 100 determines to perform a column read operation, the method 800 advances to block 804.

In block 804, the compute device 100 (e.g., the media access circuitry 108) receives a logical column read request. The column read request identifies a base address and one or more logical column numbers to read from a data cluster. The base address identifies a starting row address for the column read operation, and may be a row address that includes the starting row and/or column of the cluster (e.g., row zero) or a row address within the data cluster. The media access circuitry 108 may receive the column read request, for example, from the memory controller 106. The column read request may originate from the host processor 102. In some embodiments, the memory access may be generated by the vector function unit 130 of the memory controller 106, for exampling in response to a macro command received from the host processor 102.

In block 806, the compute device 100 determines a die offset for each die of the memory media 110 based on the requested logical columns and the base address. The compute device 100 may determine the offset for each die based on the difference between the base address and the row address of the left-most tile in that die that includes data from the requested logical column. Data from a different logical column may be read from each die of the memory media 110. In some embodiments in block 808 the compute device 100 may determine the die offsets based on a starting address for the logical column requested for each die. For example, the base address and die offset may add together to the row address of the left-most tile in each die that includes data from the associated logical column In block 810, the compute device 100 programs each die of the memory media 100 with the die offsets determined as described above in connection with block 806. The compute device 100 may program each die using the associated data bus that is coupled to that die. For example, the die offset may be programmed when setting up each data stream read from the memory media.

In block 812, the compute device 100 reads logical column data for the requested logical column(s) diagonally from the memory media 110 starting at the base address and using a modulo limit counter. The compute device 100 may issue a column read to all dies of the memory media 110 over a shared command/address (CA) bus. In block 814, each die of the memory media 100 starts reading data at the supplied base address plus the corresponding die offset programmed as described above in connection with block 810. Thus, the compute device 100 may read the column data in parallel across multiple dies of the selected partition. After reading data (e.g., a bit) from the current tile of each die, in block 816 each die increments one or more internal counters (e.g., row counter and/or column counter) modulo a preconfigured modulo limit. The modulo limit may be the width of each die in tiles (e.g., in columns); for example, in an illustrative embodiment, the modulo limit may be 128. After incrementing the counters, the memory media 110 continues reading column data across each die of the memory media 110. After performing the column read operation, the method 800 loops back to block 802 to monitor for additional read operations. Accordingly, the compute device 100 may read multiple logical columns in a single column read operation for small data clusters having a length less than or equal to the width of each die in tiles (e.g., data clusters of length 128 for the illustrative embodiment having dies with 128 tiles each).

Referring back to block 802, if the compute device 100 determines to perform a row read operation, the method 800 branches to block 818, in which the compute device 100 determines whether to perform a row read operation. If not, the method 800 loops back to block 802 to continue monitoring for read operations. If the compute device 100 determines to perform a row read operation, the method 800 advances to block 820.

In block 820 the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102. In block 822, the compute device 100 reads row data at the row address in the memory media 110. The row data is stored in the memory media 110 in a rotated format as described above in connection with FIG. 5. The compute device 100 may thus perform one or more rotation operations to recover the original, logical row data. After reading the data, the method 800 loops back to block 802 to continue monitoring for read operations.

Figure 9:
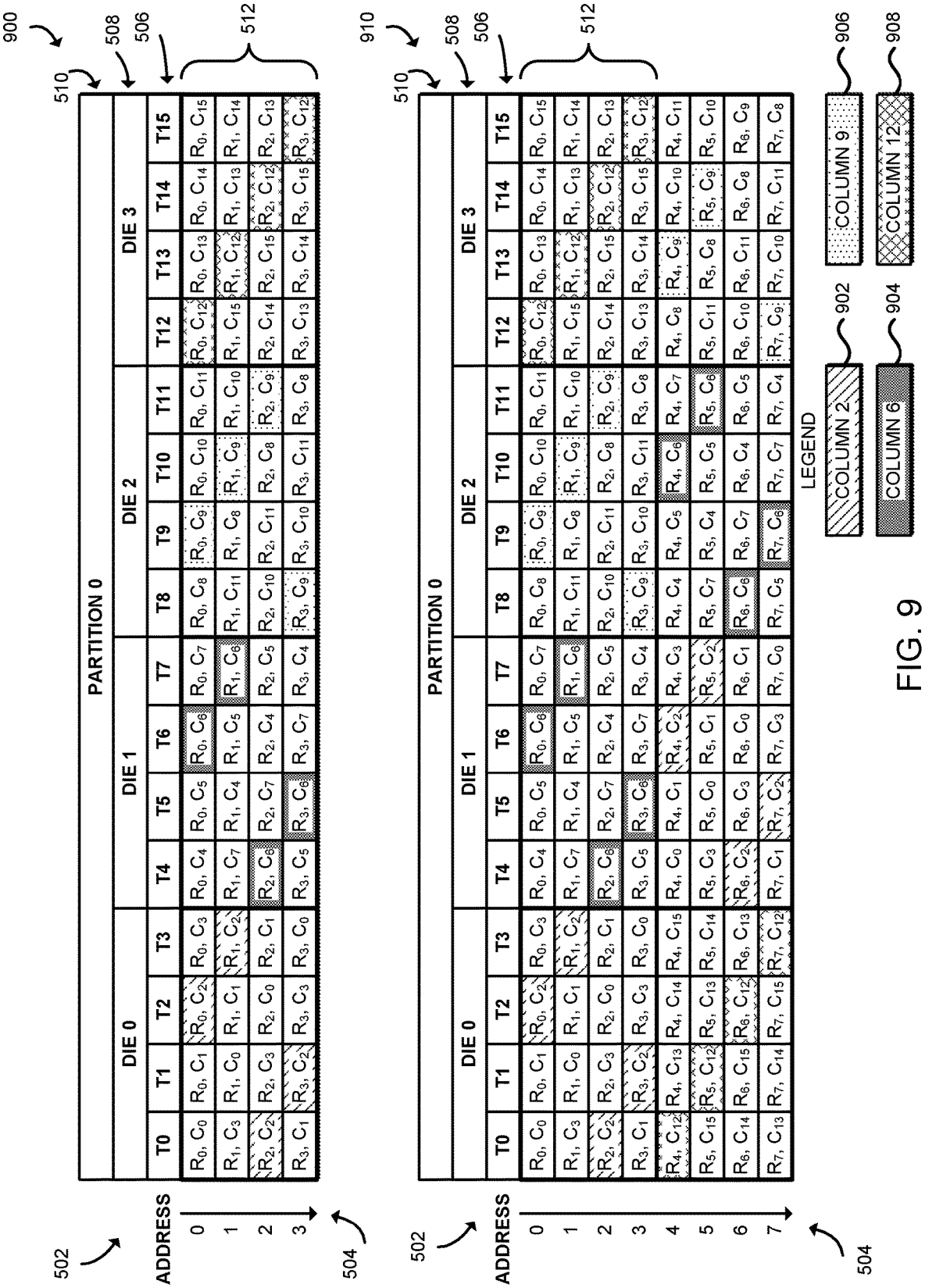
FIG. 9 is a schematic diagram illustrating memory accesses that may be performed by the method of FIG. 8.

Referring now to FIG. 9, diagram 900 illustrates example column reads of a data cluster included in the memory media 502 that may be performed according to the method 800 of FIG. 8. As described above, the illustrative memory media includes four dies 508 having four tiles 506 each. The diagram 900 shows data included in the logical column 2 as highlighted cells 902, data included in the logical column 6 as highlighted cells 904, data included in the logical column 9 as highlighted cells 906, and data included in the logical column 12 as highlighted cells 908. The illustrative diagram 900 shows a small data cluster having a length of 4, illustratively located at row addresses 0-3. Accordingly, the illustrative compute device 100 may perform a column read of four logical columns having length of 4 using a single column read operation.

To perform a column read of logical columns 2, 6, 9, and 12 using the method 800 of FIG. 8, the compute device 100 may determine die offsets of 0, 0, 1, and −2 for die 0, die 1, die 2, and die 3, respectively. The compute device 100 may issue a column read with the starting row address (e.g., base address) of 2. As shown in FIG. 9, when the starting row address of 2 is added to the die offsets, data is read from row addresses 2, 2, 3, and 0 from die 0, die 1, die 2, and die 3, respectively. As described above, after reading the current bit, each die 508 increments one or more internal counters subject to the modulo limit 512 and continues reading data from logical column 2. Thus, using the illustrated die offsets, all data in the logical columns 2, 6, 9, and 12 may be read with a single column read operation.

Still referring to FIG. 9, diagram 910 illustrates example column reads from a data cluster having length of 8, illustratively located at row addresses 0-7. To perform a column read of logical columns 2, 6, 9, and 12 using the method 800 of FIG. 8, the compute device 100 may initially determine die offsets of 0, 0, 1, and −2 for die 0, die 1, die 2, and die 3, respectively. The compute device 100 may issue a column read with the starting row address (e.g., base address) of 2, which reads four bits from each logical column 2, 6, 9, and 12 in a single column read operation as described above. Next, the compute device 100 may determine die offsets of 0, 2, 2, 3 for die 0, die 1, die 2, and die 3, respectively. The compute device 100 may issue a column read with the starting row address (e.g., base address) of 4. As shown in FIG. 9, when the starting row address of 4 is added to the die offsets, data is read from row addresses 4, 6, 6, and 7 from die 0, die 1, die 2, and die 3, respectively. Accordingly, eight bits from each of logical column 2, 6, 9, and 12 may be read in two column read operations. Additionally, although the column data is shown in FIG. 9 as being rotated in column sub-groups across the media dies, it should be understood that rotation across column sub-groups may not be required with dynamic die offsets. In those embodiments, the column data may be rotated within each media die.

Accordingly, performing column reads as described in FIGS. 8-9 may improve column read speed as a function of cluster size. For example, in an embodiment having eight dies of 128 tiles (columns) each, reads of clusters having a length less than 128 may have an 8× improvement (based on the number of dies), reads of clusters having a length less than 256 may have a 4× improvement, and so on. Reprogramming the die offsets may reduce performance in some embodiments. For example, in an embodiments, reprogramming the die offsets before each read may reduce read performance by 2×. Even accounting for die offset reprogramming, overall read performance may be improved for small clusters. For example, performance may be improved about 4× for clusters having a length less than 128, about 2× for clusters having a length less than 256, and so on.

Figure 10:
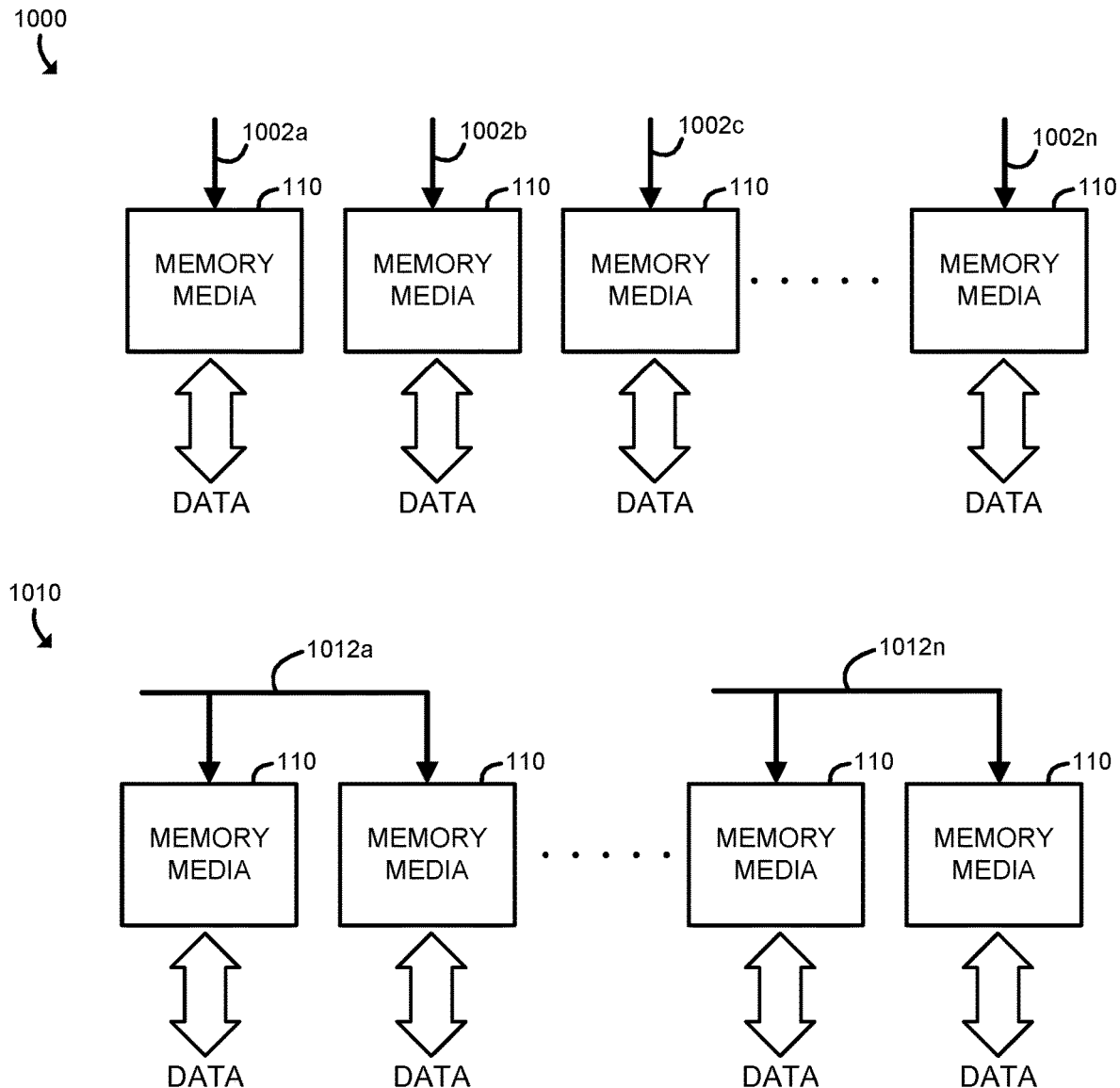
FIG. 10 is a simplified diagram of at least one embodiment of the memory media of the compute device of FIG. 1 in a DIMM with multiple command/address (CA) buses.

Referring now to FIG. 10, the compute device 100, in some embodiments, may utilize a dual in-line memory module (DIMM) architecture 1000. In the architecture 1000, each die of the memory media 110 is connected to a dedicated command address (CA) bus 1002. For example, in the illustrative embodiment, four CA buses 1002a, 1002b, 1002c, 1002n are shown, and each CA bus 1002 is coupled to a dedicated die of the memory media 110. In other embodiments, the DIMM architecture 1000 may include a different number of CA buses corresponding to the number of dies, such as eight CA buses 1002. As such, in operation, multiple memory addresses may be supplied to the dies of the memory media 110 in parallel, and data is read out in parallel across all of the memory media 110.

Still referring to FIG. 10, in some embodiments, the compute device 100 may utilize a DIMM architecture 1010. The DIMM architecture 1010 includes multiple CA buses 1012, and each CA bus 1012 is coupled to multiple dies of the memory media 110. For example, in the illustrative embodiment, each CA bus 1012a, 1012n is coupled to two dies of the memory media 110. In other embodiments, each CA bus 1012 may be coupled to a different number of dies (e.g., four dies). Similar to the DIMM architecture 300 of FIG. 3, data is read out in parallel across all of the memory media 110 connected to each of the CA buses 1012. Data may be laid out across the memory media 110 coupled to each CA bus 1012 in a configuration to allow reading the same column across all of the connected dies of the memory media 110.

Figure 11:
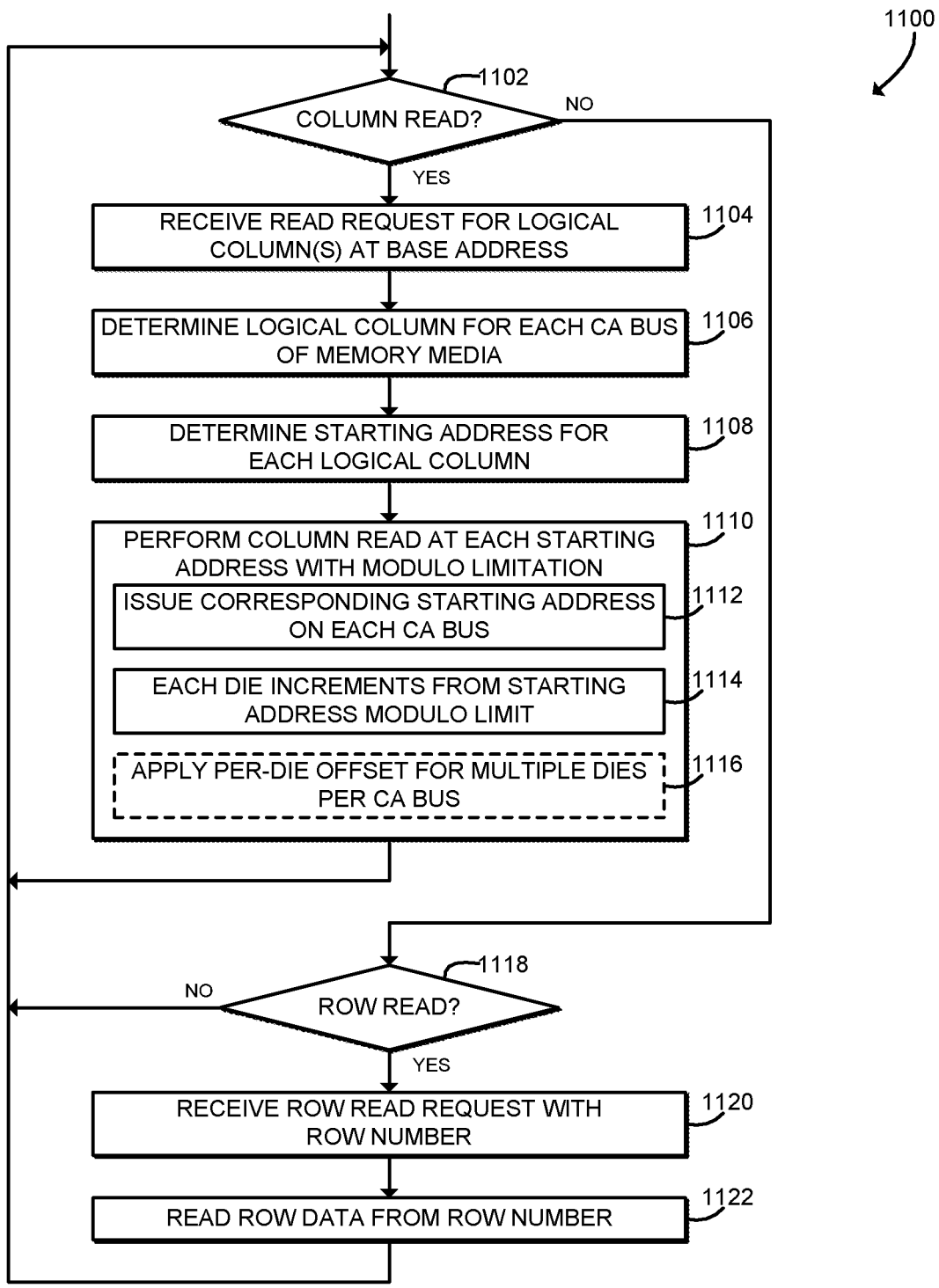
FIG. 11 is a simplified flow diagram of at least one embodiment of a method for a column read operation with per-die addressing that may be performed by the compute device of FIG. 1.

Referring now to FIG. 11, the compute device 100, in operation, may execute a method 1100 for column reads with per-die addressing. The method 1100 is described with reference to the memory 104. However, it should be understood that the method 1100 could be performed additionally or alternatively using the data storage device 114. The method 1100 begins with block 1102 in which the compute device 100 (e.g., the media access circuitry 108) determines whether to perform a column read operation. If not, the method 1100 branches ahead to block 1118, described below. If the compute device 100 determines to perform a column read operation, the method 1100 advances to block 1104.

In block 1104, the compute device 100 (e.g., the media access circuitry 108) receives a logical column read request. The column read request identifies a base address and one or more logical column numbers to read from a data cluster. The base address identifies a starting row address for the column read operation, and may be a row address that includes the starting row and/or column of the cluster (e.g., row zero) or a row address within the data cluster. The media access circuitry 108 may receive the column read request, for example, from the memory controller 106. The column read request may originate from the host processor 102. In some embodiments, the memory access may be generated by the vector function unit 130 of the memory controller 106, for exampling in response to a macro command received from the host processor 102.

In block 1106, the compute device 100 determines a logical column for each CA bus of the memory media 110. As described above in connection with FIG. 10, the memory media 110 may include multiple CA buses, and the compute device 100 may read a different logical column from each CA bus. The compute device 100 may identify logical columns for reading, for example, based on set bits or other search query. In block 1108, the compute device 100 determines a starting address for each logical column. The starting address may be the row address of the left-most tile in the die coupled to the CA bus that includes data from the identified logical column.

In block 1110, the compute device 100 reads logical column data for the requested logical column(s) diagonally from the memory media 110 subject to a modulo limit counter. In block 1112, the compute device may issues a column read to a corresponding starting address on each CA bus of the memory media 110. As described above, the starting address provided to each CA bus may correspond to a particular logical column. In block 1114, each die of the memory media 100 starts reading data at the supplied starting address. Thus, the compute device 100 may read the column data in parallel across multiple dies of the selected partition. After reading data (e.g., a bit) from the current tile of each die, each die increments one or more internal counters (e.g., row counter and/or column counter) modulo a preconfigured modulo limit. The modulo limit may be the width of each die in tiles (e.g., in columns); for example, in an illustrative embodiment, the modulo limit may be 128. After incrementing the counters, the memory media 110 continues reading column data across each die of the memory media 110. In some embodiments, in block 1116 the dies of the memory media 110 may apply a per-die offset for multiple dies connected to a shared CA bus. For example, by applying the offset, data from the same logical column may be read from multiple dies. After performing the column read operation, the method 1100 loops back to block 1102 to monitor for additional read operations.

Referring back to block 1102, if the compute device 100 determines to perform a row read operation, the method 1100 branches to block 1118, in which the compute device 100 determines whether to perform a row read operation. If not, the method 1100 loops back to block 1102 to continue monitoring for read operations. If the compute device 100 determines to perform a row read operation, the method 1100 advances to block 1120.

In block 1120 the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102. In block 1122, the compute device 100 reads row data at the row address in the memory media 110. The row data is stored in the memory media 110 in a rotated format as described above in connection with FIG. 5. The compute device 100 may thus perform one or more rotation operations to recover the original, logical row data. After reading the data, the method 1100 loops back to block 1102 to continue monitoring for read operations.

Accordingly, by using per-die addressing with dedicated CA buses, the compute device 100 may read multiple logical columns in a single column read operation for small data clusters having a length less than or equal to the width of each die in tiles (e.g., data clusters of length 128 for the illustrative embodiment having dies with 128 tiles each). Larger cluster sizes may require additional read operations (e.g., two read operations for clusters having length of up to 256). In an embodiment having eight dies and thus eight CA buses, read speedups may be up to 8×. Other embodiments having multiple dies per CA bus may also improve performance relative to implementations with a single shared CA bus, thus providing tradeoffs between a large number of CA buses (with higher performance and higher cost) and a smaller number of CA buses (less performance and less cost). Speedup for DIMM architectures with multiple CA buses relative to a single shared CA bus may converge toward 1× for larger cluster sizes.

EXAMPLES

Illustrative examples of the technologies disclosed herein are provided below. An embodiment of the technologies may include any one or more, and any combination of, the examples described below.

Example 1 includes a device comprising circuitry to be connected to a column-addressable memory, wherein the circuitry is to: determine a plurality of die offsets based on a logical column number of a data cluster of a logical matrix; determine a base address based on the logical column number; program a plurality of dies of the column-addressable memory with the plurality of die offsets, wherein each of the dies is programmed with an associated die offset; and read logical column data of the data cluster from the column-addressable memory in response to programming of the plurality of dies, wherein to read the logical column data comprises to add, by each of the plurality of dies, the corresponding die offset to the base address.

Example 2 includes the subject matter of Example 1, and wherein the circuitry is further to: determine a second base address based on a second logical column number; and read second logical column data of the data cluster from the column-addressable memory in response to the programming of the plurality of dies, wherein to read the second logical column data comprises to add, by each of the plurality of dies, the corresponding die address to the second base address.

Example 3 includes the subject matter of any of Examples 1 and 2, and wherein the logical column number and the second logical column number are included in a logical column group of the logical matrix, wherein the logical column group includes a first number of logical columns, and wherein each die of the plurality of dies includes the first number of tiles.

Example 4 includes the subject matter of any of Examples 1-3, and wherein to program the plurality of dies comprises to send a die offset to each die via a data bus coupled to each die.

Example 5 includes the subject matter of any of Examples 1-4, and wherein: to determine the plurality of die offsets comprises to determine a die offset for each die based on a logical column number for each die; and to read the logical column data comprises to read logical column data for each logical column number associated with each die of the plurality of dies.

Example 6 includes the subject matter of any of Examples 1-5, and wherein to read the logical column data comprises, for each die of the plurality of dies, to: initialize an internal address counter with the base address; read a column of the die at the internal address counter plus the die offset programmed to the die; and increment the internal address counter subject to a modulo limit in response to reading the column.

Example 7 includes the subject matter of any of Examples 1-6, and wherein the modulo limit comprises a first number, and wherein each die of the plurality of dies comprises the first number of tiles.

Example 8 includes a system comprising: a column-addressable memory; and circuitry connected to the memory, wherein the circuitry is to: determine a plurality of die offsets based on a logical column number of a data cluster of a logical matrix; determine a base address based on the logical column number; program a plurality of dies of the column-addressable memory with the plurality of die offsets, wherein each of the dies is programmed with an associated die offset; and read logical column data of the data cluster from the column-addressable memory in response to programming of the plurality of dies, wherein to read the logical column data comprises to add, by each of the plurality of dies, the corresponding die offset to the base address.

Example 9 includes the subject matter of Example 8, and wherein the circuitry is in a data storage device.

Example 10 includes the subject matter of any of Examples 8 and 9, and wherein the circuitry is in a memory device, and wherein the system further comprises a processor to interact with the memory device.

Example 11 includes the subject matter of any of Examples 8-10, and wherein the circuitry is further to: determine a second base address based on a second logical column number; and read second logical column data of the data cluster from the column-addressable memory in response to the programming of the plurality of dies, wherein to read the second logical column data comprises to add, by each of the plurality of dies, the corresponding die address to the second base address.

Example 12 includes the subject matter of any of Examples 8-11, and wherein the logical column number and the second logical column number are included in a logical column group of the logical matrix, wherein the logical column group includes a first number of logical columns, and wherein each die of the plurality of dies includes the first number of tiles.

Example 13 includes the subject matter of any of Examples 8-12, and wherein to program the plurality of dies comprises to send a die offset to each die via a data bus coupled to each die.

Example 14 includes a device comprising: a column-addressable memory comprising a plurality of command/address buses, wherein each command/address bus is coupled to a die of a column-addressable memory; and circuitry connected to the memory, wherein the circuitry is to: determine a plurality of logical columns of a data cluster of a logical matrix; determine a starting address for each of the plurality of logical columns; and issue a column read for each of the logical columns at a corresponding starting address via a corresponding command/address bus of the plurality of command/address buses.

Example 15 includes the subject matter of Example 14, and wherein the circuitry is further to read logical column data of the data cluster from the column-addressable memory in response to issuance of the column read.

Example 16 includes the subject matter of any of Examples 14 and 15, and wherein to read the logical column data comprises, for each die of the column-addressable memory, to: initialize an internal address counter with the corresponding starting address received via the corresponding command/address bus; read a column of the die at the internal address counter; and increment the internal address counter subject to a modulo limit in response to a read of the column.

Example 17 includes the subject matter of any of Examples 14-16, and wherein the modulo limit comprises a first number, and wherein each die of the plurality of dies comprises the first number of tiles.

Example 18 includes the subject matter of any of Examples 14-17, and wherein the column-addressable memory comprises a plurality of dies, and wherein each die is coupled to a separate command/address bus.

Example 19 includes the subject matter of any of Examples 14-18, and wherein the column-addressable memory comprises a plurality of dies, and wherein each command/address bus is coupled to a subset of the plurality of dies, wherein each subset includes two or more of the plurality of dies.

Example 20 includes a system comprising: a column-addressable memory comprising a plurality of command/address buses, wherein each command/address bus is coupled to a die of a column-addressable memory; circuitry connected to the memory, wherein the circuitry is to: determine a plurality of logical columns of a data cluster of a logical matrix; determine a starting address for each of the plurality of logical columns; and issue a column read for each of the logical columns at a corresponding starting address via a corresponding command/address bus of the plurality of command/address buses; and a processor to interact with the circuitry.

Example 21 includes the subject matter of Example 20, and wherein the circuitry is in a data storage device coupled to the processor.

Example 22 includes the subject matter of any of Examples 20 and 21, and wherein the circuitry is in a memory device coupled to the processor.

Example 23 includes the subject matter of any of Examples 20-22, and wherein the circuitry is further to read logical column data of the data cluster from the column-addressable memory in response to issuance of the column read.

Example 24 includes the subject matter of any of Examples 20-23, and wherein the column-addressable memory comprises a plurality of dies, and wherein each die is coupled to a separate command/address bus.

Example 25 includes the subject matter of any of Examples 20-24, and wherein the column-addressable memory comprises a plurality of dies, and wherein each command/address bus is coupled to a subset of the plurality of dies, wherein each subset includes two or more of the plurality of dies.

The invention claimed is:

1. A device comprising circuitry to be connected to a column-addressable memory, wherein the circuitry is to:
   determine a plurality of die offsets based on a logical column number of a data cluster of a logical matrix;
   determine a base address based on the logical column number;
   program a plurality of dies of the column-addressable memory with the plurality of die offsets, wherein each of the dies of the plurality of dies is programmed with a corresponding die offset based on the logical column number; and
   read logical column data of the data cluster from the column-addressable memory in response to programming of the plurality of dies, wherein to read the logical column data comprises, for each die of the plurality of dies, to:
      add the corresponding die offset to the base address,
      initialize an internal address counter with the base address,
      read a column of the die at the internal address counter plus the corresponding die offset programmed to the die, and
      increment the internal address counter subject to a modulo limit in response to reading the column.

2. The device of claim 1, wherein the circuitry is further to:
   determine a second base address based on a second logical column number; and
   read second logical column data of the data cluster from the column-addressable memory in response to programming the plurality of dies, wherein to read the second logical column data comprises to add, by each of the plurality of dies, the corresponding die offset to the second base address.

3. The device of claim 2, wherein the logical column number and the second logical column number are included in a logical column group of the logical matrix, wherein the logical column group includes a first number of logical columns, and wherein each die of the plurality of dies includes a first number of tiles.

4. The device of claim 1, wherein to program the plurality of dies comprises to send a die offset of the plurality of die offsets to each die via a data bus coupled to each die.

5. The device of claim 4, wherein:
   to determine the plurality of die offsets comprises to determine a die offset for each die based on the logical column number; and
   to read the logical column data comprises to read logical column data for each logical column number corresponding to each die of the plurality of dies.

6. The device of claim 3, wherein the modulo limit comprises a first number, and wherein each die of the plurality of dies comprises the first number of tiles.

7. A system comprising:
   a column-addressable memory; and
   circuitry connected to the column-addressable memory, wherein the circuitry is to:
      determine a plurality of die offsets based on a logical column number of a data cluster of a logical matrix,
      determine a base address based on the logical column number,
      program a plurality of dies of the column-addressable memory with the plurality of die offsets, wherein each die of the plurality of dies is programmed with a corresponding die offset, and
      read logical column data of the data cluster from the column-addressable memory in response to programming of the plurality of dies, wherein to read the logical column data comprises, for each die of the plurality of dies to:
         add the corresponding die offset to the base address,
         initialize an internal address counter with the base address,
         read a column of the die at the internal address counter plus the corresponding die offset programmed to the die, and
         increment the internal address counter subject to a modulo limit in response to reading the column.

8. The system of claim 7, wherein the circuitry is in a data storage device.

9. The system of claim 7, wherein the circuitry is in a memory device, and wherein the system further comprises a processor to interact with the memory device.

10. The system of claim 7, wherein the circuitry is further to:
   determine a second base address based on a second logical column number; and
   read second logical column data of the data cluster from the column-addressable memory in response to programming the plurality of dies, wherein to read the second logical column data comprises to add, by each of the plurality of dies, the corresponding die offset to the second base address.

11. The system of claim 10, wherein the logical column number and the second logical column number are included in a logical column group of the logical matrix, wherein the logical column group includes a first number of logical columns, and wherein each die of the plurality of dies includes a first number of tiles.

12. The system of claim 7, wherein to program the plurality of dies comprises to send a die offset of the plurality of die offsets to each die via a data bus coupled to each die.

13. A device comprising:
a column-addressable memory comprising a plurality of command/address buses, wherein each command/address bus is coupled to a die of a column-addressable memory; and
circuitry connected to the column-addressable memory, wherein the circuitry is to:
determine a plurality of logical columns of a data cluster of a logical matrix,
determine a starting address for each of the plurality of logical columns,
issue a column read for each of the logical columns at a corresponding starting address via a corresponding command/address bus of the plurality of command/address buses,
read logical column data of the data cluster from the column-addressable memory in response to issuance of the column read, including, for each die of the column-addressable memory, to:
initialize an internal address counter with the corresponding starting address received via the corresponding command/address bus,
read a column of the die at the internal address counter, and
increment the internal address counter subject to a modulo limit in response to a read of the column.

14. The device of claim 13, wherein the modulo limit comprises a first number, and wherein each die of the plurality of dies comprises a first number of tiles.

15. The device of claim 13, wherein the column-addressable memory comprises a plurality of dies, and wherein each die is coupled to a separate command/address bus.

16. The device of claim 13, wherein the column-addressable memory comprises a plurality of dies, and wherein each command/address bus is coupled to a subset of the plurality of dies, wherein each subset includes two or more of the plurality of dies.

17. A system comprising:
a column-addressable memory comprising a plurality of command/address buses, wherein each command/address bus is coupled to a die of a column-addressable memory; and
circuitry connected to the column-addressable memory, wherein the circuitry is to:
determine a plurality of logical columns of a data cluster of a logical matrix,
determine a starting address for each of the plurality of logical columns, and
issue a column read for each of the logical columns at a corresponding starting address via a corresponding command/address bus of the plurality of command/address buses, the corresponding starting address and the corresponding command/address bus based on a logical column of the plurality of logical columns; and
a processor to interact with the circuitry to:
read logical column data of the data cluster from the column-addressable memory in response to issuance of the column read, including, for each die of the column-addressable memory, to:
initialize an internal address counter with the corresponding starting address received via the corresponding command/address bus,
read a column of the die at the internal address counter, and
increment the internal address counter subject to a modulo limit in response to a read of the column.

18. The system of claim 17, wherein the circuitry is in a data storage device coupled to the processor.

19. The system of claim 17, wherein the circuitry is in a memory device coupled to the processor.

20. The system of claim 17, wherein the column-addressable memory comprises a plurality of dies, and wherein each die is coupled to a separate command/address bus.

21. The system of claim 17, wherein the column-addressable memory comprises a plurality of dies, and wherein each command/address bus is coupled to a subset of the plurality of dies, wherein each subset includes two or more of the plurality of dies.

* * * * *